Sept. 5, 1950

G. J. HEISIG 2,521,061

COMBINED FOCUS AND CENTERING CONTROL FOR CATHODE-RAY TUBES

Filed March 18, 1948

INVENTOR.

Garth J. Heisig

By Foorman L. Mueller

Atty.

Patented Sept. 5, 1950 2,521,061

UNITED STATES PATENT OFFICE 2,521,061

COMBINED FOCUS AND CENTERING CONTROL FOR CATHODE-RAY TUBES

Garth J. Heisig, Chicago, Ill., assignor to Motorola, Inc., Chicago, Ill., a corporation of Illinois Application March 18, 1948, Serial No. 15,524

5 Claims. (Cl. 250—161)

This invention relates to systems utilizing magnetically focused cathode ray tubes.

In television receivers and other systems utilizing cathode ray tubes, some form of centering control customarily is provided for the tube so that the image traced by the electron beam can be centered both horizontally and vertically on the viewing screen. It has been the practice heretofore to employ variable electric elements such as potentiometers in the deflection circuits of the tubes as a means of centering the image on the screen. In a cathode ray tube having electromagnetic deflection, for instance, the steady component of the current in a deflecting coil is varied to change the position of the image. Arrangements such as these complicate the deflection circuits and are considered undesirable in many instances, particularly in the lower-priced sets.

An object of the present invention is to provide an improved centering control for a cathode ray tube which is independent of the deflection circuits.

A further object is to provide a novel centering control which is wholly mechanical, simply constructed, and easy to manipulate.

A still further object is to utilize the focusing coil of an electromagnetic cathode ray tube for the dual purpose of focusing and centering the electron beam.

A feature of the invention consists in supporting the focusing coil of an electromagnetic cathode ray tube on a swivel mounting which permits limited turning of the coil about mutually perpendicular axes at right angles to the axis of the tube. In this way the electron beam can be directed toward the right or left and up or down as desired to center the image or picture on the viewing screen.

The foregoing and other objects, features and advantages of the invention will be better understood from a study of the following description taken in connection with the accompanying drawing, wherein.

In practicing the invention, the magnetic focusing coil of a cathode ray tube is pivotally supported on bearings carried by a U-shaped supporting member or coil holder which in turn is pivotally mounted on the chassis or other supporting base. The coil and its holder are capable of being turned as a unit on a vertical axis within the limits allowed by the clearance between the coil and the neck of the cathode ray tube on which it is disposed. The coil itself can also be turned on a horizontal axis at right angles to the axis of the tube within the limits permitted by the clearance between the coil and the tube. A suitable handle attached to the coil form is provided for manipulating the coil.

Figure 1:
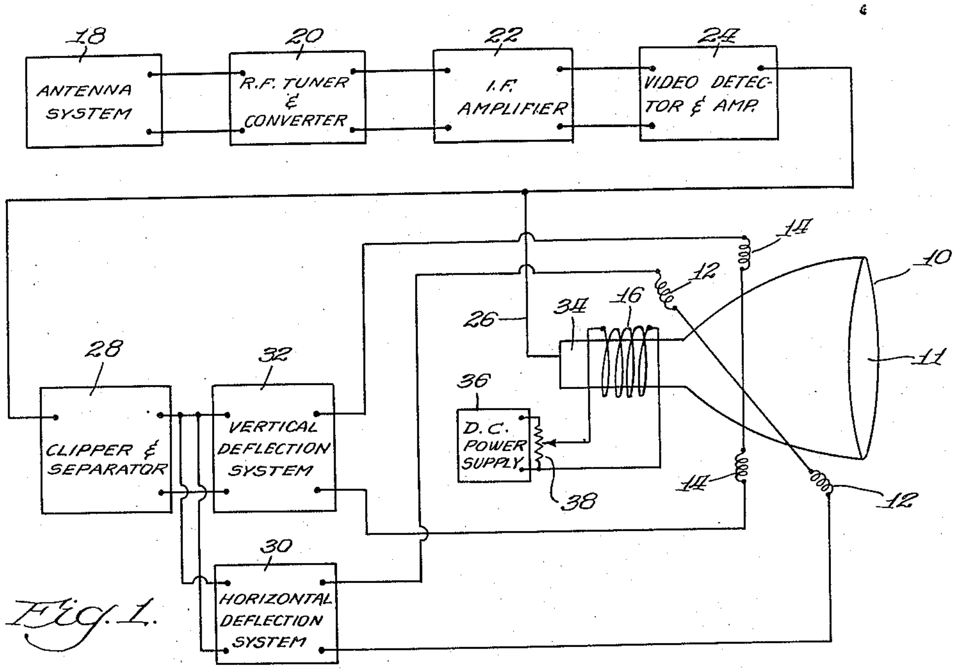
Fig. 1 is a schematic view of a television receiving system in which the present invention is adapted to be used.

Referring now to the drawings, Fig. 1 schematically represents a television receiver having a cathode ray tube 10, on the viewing screen 11 of which the television picture or image is traced. The tube 10 is equipped with electromagnetic deflecting and focusing elements. Horizontal and vertical deflections of the electron beam are performed respectively by coils 12 and 14, and an electromagnetic coil 16 serves to focus the electron beam on the screen 11. The circuit components associated with the cathode ray tube 10 are represented diagrammatically inasmuch as they are merely incidental to the invention.

Incoming radio-frequency signals are picked up by the antenna system 18 and are passed to the radio-frequency tuner and converter 20, which selects the signals of the particular frequency channel desired and converts them to intermediate-frequency signals. The intermediate-frequency signals then are amplified by the amplifier 22, after which they are detected by the video detector and amplifier 24 to furnish the composite video signal. The picture or video portion of the composite signal is applied through a conductor 26 to a control electrode such as a grid (not shown) of the tube 10 for varying the intensity of the electron beam to produce the light and dark areas of the television picture on the screen 11. The composite signal also contains synchronizing pulses, and these are separated from the video component by a clipper and separator 28. The horizontal and vertical synchronizing pulses are applied respectively to the horizontal deflection system 30 and the vertical deflection system 32 so that these systems will be properly synchronized with the received signal. The output currents of the deflection systems 30 and 32 pass respectively through the horizontal deflection coil 12 and the vertical deflection coil 14. These coils produce intersecting magnetic fields at right angles to the longitudinal axis of the cathode ray tube 10 for deflecting the electron beam horizontally and vertically at linear rates with respect to time. In this way the entire picture field is scanned to trace out the image or picture on the screen 11.

The focusing coil 16 is disposed so as to encircle the elongated neck 34 of the tube 10 in substantially coaxial relation therewith. The coil 16 is supplied with current by a direct-current power supply generally designated 36, Fig. 1. The sharpness with which the electron beam of the cathode ray tube 10 is focused upon the screen 11 is determined by the strength of the magnetic field produced by the coil 16, and this in turn depends upon the current flowing in the coil. A suitable means such as a potentiometer 38 associated with the power supply 36 is provided to regulate the strength of the current in the coil 16. The coil 16 may, if desired, be mounted so that its position can be adjusted longitudinally of the tube 10 to further assist in focusing the beam. For simplicity of illustration, however, this adjustment is not shown in the drawing.

Figure 2:
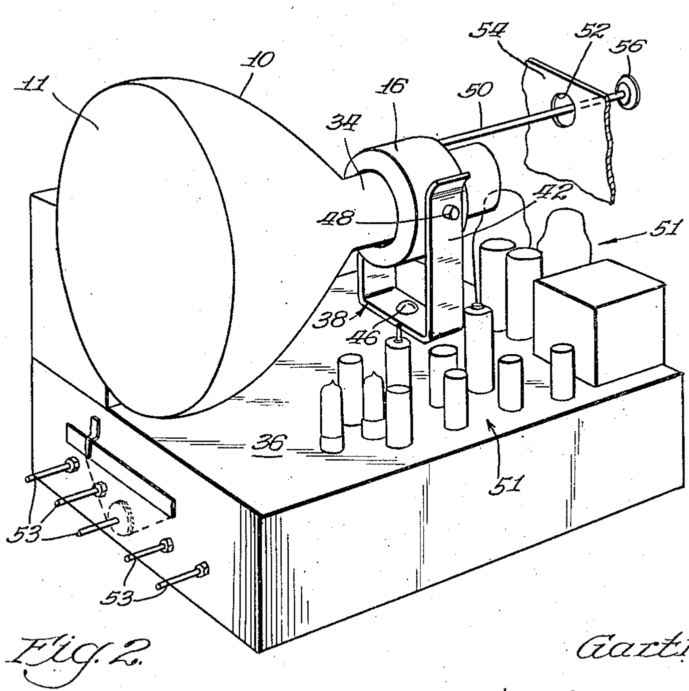
Fig. 2 is a simplified perspective view of the television receiver chassis and the cathode ray tube mounted thereon, showing a typical embodiment of the invention utilized in such apparatus.
Figure 3:
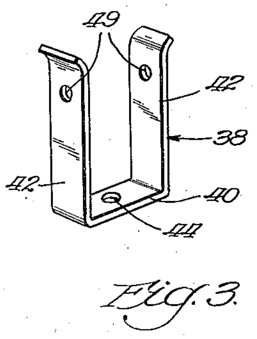
Fig. 3 is a perspective detail view of a coil holder constructed in accordance with the principles of the invention.

Referring now to Fig. 2, the cathode ray tube 10 is mounted in any suitable fashion on a chassis 36, with the longitudinal axis of the tube 10 extending in a horizontal direction. In accordance with the invention, the focusing coil 16 is carried by a holder or supporting member which is pivotally mounted on the chassis 36, or alternatively, on a base member supported by the chassis. The holder 38, as clearly shown in Fig. 3, is U-shaped, having a horizontal bight portion 40 and vertically extending legs 42. A hole 44 in the bight portion 40 receives a screw 46 which pivotally connects the holder 38 to the chassis 36. The focusing coil 16 is bracketed by the legs 42 and is pivotally connected to said legs by bearing studs 48, which are received in holes 49 in the legs 42. The coil 16 is capable of being turned on a horizontal axis extending through the studs 48 at right angles to the axis of the tube 10, within the limits permitted by the clearance between the coil 16 and the neck 34 of the tube 10. The pivot 46 allows the holder 38 and the coil 16 to be turned as a unit on a vertical axis, within the limits permitted by the clearance between the coil 16 and the neck 34. This enables the electron beam in the tube 10 to be directed up or down and to the right or left as desired in order to center the image or picture on the screen 11.

The deflecting coils 12 and 14 are omitted from Fig. 2 so as not to obscure the showing of the invention. These coils usually are mounted adjacent the tube neck 34 in front of the focusing coil 16. The usual chassis components generally designated 51 (tubes, capacitors, coils, power supply) are represented schematically in Fig. 2. The various manual controls of the receiver (other than the centering control) are represented by the shafts 53 projecting from the front of the chassis 36.

For convenience in manipulating the coil 16, a handle 50 is connected to the coil form and extends rearwardly therefrom through an aperture 52 in the safety panel or shield 54 that customarily is provided at the rear of the receiver. The handle 50 terminates in a knob 56 which can be grasped by the operator to move the coil 16 on its bearings 48 and pivot 46. The requisite amount of friction is afforded at these pivot points so that the coil 16 will retain the position to which it is adjusted. The form of the holder 38 is a matter of choice so long as the focusing coil 16 can be turned about transverse axes perpendicular to the axis of the tube 10 to obtain the desired centering effect.

The centering control described above has the advantage that it is simple to operate and inexpensive to manufacture. It eliminates the separate horizontal and vertical centering controls heretofore employed, and in its operation it has no effect upon the deflection systems 30 and 32, Fig. 1.

The illustrated embodiment is capable of being modified without departing from the principles of the invention set forth above, and it is intended to cover all such modifications by the appended claims.

I claim:

1. A centering control for a cathode ray tube comprising an electromagnetic coil adapted to be positioned on the tube in substantially coaxial relation therewith, a substantially U-shaped supporting member bracketing said coil and pivotally mounted for movement of said member and said coil about a vertical axis, bearing elements connecting said coil to said supporting member for providing pivotal movement of said coil about a horizontal axis, and a single controlling handle connected to said coil for manipulating the same.

2. A centering control for a cathode ray tube comprising an electromagnetic focussing coil adapted to be positioned on the tube in substantially coaxial relation therewith, a substantially U-shaped supporting member for said coil having a horizontal bight portion and vertically extending legs, bearing elements connecting said coil to said arms of said supporting member for providing pivotal movement of said coil about a horizontal axis, a pivotal mounting for said bight portion permitting movement of said member and said coil about a vertical axis, and a single controlling handle connected to said coil for moving the same about said horizontal and vertical axes.

3. A centering control for a cathode ray tube comprising annular magnetic means adapted to be positioned on the tube in substantially coaxial relation therewith, a substantially U-shaped supporting member for said magnetic means having a horizontal bight portion and vertically extending legs, bearing elements connecting said magnetic means to said supporting member for providing piovtal movement of said magnetic means about a horizontal axis, a pivotal mounting for said bight portion permitting movement of said member and said magnetic means about a vertical axis, and a single controlling handle connected to said magnetic means for moving the same about said horizontal and vertical axes.

4. A centering control for a cathode ray tube comprising an electromagnetic coil adapted to be positioned on the tube in substantially coaxial relation therewith, a holder for said coil, bearing elements connecting said coil to said holder for providing pivotal movement of said coil with respect to said holder about a horizontal axis, a pivotal mounting for said holder permitting movement of said holder and said coil about a vertical axis, and a single controlling handle connected to said coil for manipulating the same.

5. A centering control for a cathode ray tube including in combination, an electromagnetic coil adapted to be positioned on the tube in substantially coaxial relation therewith, supporting means for said coil permitting pivotal movement thereof about a vertical axis and a horizontal axis, said supporting means including a holder, bearing elements connecting said coil to said holder for pivotal movement about one of said axes, and pivotal mounting means for said holder permitting pivotal movement of said holder and said coil about the other one of said axes, and a single controlling handle connected to said coil for manipulating the same.

GARTH J. HEISIG.

REFERENCES CITED

The following references are of record in the file of this patent:

UNITED STATES PATENTS

| Number | Name | Date |
|---|---|---|
| 2,234,720 | De Tar | Mar. 11, 1941 |
| 2,416,687 | Fry | Mar. 4, 1947 |
| 2,440,403 | Jackson | Apr. 27, 1948 |
| 2,443,973 | Asling | June 22, 1948 |
| 2,456,399 | Gethmann | Dec. 14, 1948 |

FOREIGN PATENTS

| Number | Country | Date |
|---|---|---|
| 523,439 | Great Britain | July 15, 1940 |